(12) United States Patent
Kurachi et al.

(10) Patent No.: US 9,132,972 B2
(45) Date of Patent: Sep. 15, 2015

(54) ARTICLE DROPPING APPARATUS

(71) Applicant: YUTAKA MFG CO., LTD, Kounan-shi, Aichi (JP)

(72) Inventors: Masayasu Kurachi, Kounan (JP); Hideto Ohmi, Kounan (JP)

(73) Assignee: YUTAKA MFG. CO., LTD., Kounan-Shi, Aichi (JP)

( * ) Notice: Subject to any disclaimer, the term of this patent is extended or adjusted under 35 U.S.C. 154(b) by 0 days.

(21) Appl. No.: 14/333,117

(22) Filed: Jul. 16, 2014

(65) Prior Publication Data

US 2015/0060234 A1   Mar. 5, 2015

(30) Foreign Application Priority Data

Aug. 27, 2013   (JP) ................................. 2013-175189

(51) Int. Cl.

| | |
|---|---|
| *B65G 47/38* | (2006.01) |
| *B65G 21/10* | (2006.01) |
| *B65G 47/52* | (2006.01) |
| *B65G 47/64* | (2006.01) |
| *B65B 5/10* | (2006.01) |
| *B65B 35/50* | (2006.01) |

(52) U.S. Cl.
CPC . *B65G 47/38* (2013.01); *B65B 5/10* (2013.01); *B65B 35/50* (2013.01); *B65G 21/10* (2013.01); *B65G 47/52* (2013.01); *B65G 47/642* (2013.01)

(58) Field of Classification Search
CPC ........ B65G 21/10; B65G 21/12; B65G 21/14; B65G 47/38; B65G 47/52; B65G 47/642; B65B 5/10; B65B 35/50
USPC ....................................... 198/369.7
See application file for complete search history.

(56) References Cited

U.S. PATENT DOCUMENTS

| | | | | |
|---|---|---|---|---|
| 5,421,446 | A * | 6/1995 | Koch et al. ................. | 198/369.7 |
| 6,866,135 | B2 * | 3/2005 | Quadracci et al. ......... | 198/369.7 |
| 7,490,712 | B2 * | 2/2009 | Hamers et al. ............... | 198/588 |
| 8,074,565 | B2 * | 12/2011 | Kurachi et al. .............. | 99/450.2 |
| 8,167,136 | B2 * | 5/2012 | Betti ............................. | 209/620 |
| 8,833,546 | B2 * | 9/2014 | Tsai ............................. | 198/812 |
| 8,851,275 | B2 * | 10/2014 | Tsai ............................. | 198/812 |

FOREIGN PATENT DOCUMENTS

JP   3088772 B2   9/2000

* cited by examiner

*Primary Examiner* — Leslie A Nicholson, III
*Assistant Examiner* — Keith R Campbell
(74) *Attorney, Agent, or Firm* — Ladas & Parry LLP

(57) ABSTRACT

An article dropping apparatus may include a first shutter and a second shutter. A first movable member is movable relative to the first shutter. A second movable member is movable relative to the second shutter. An article may be supported by the first shutter and the second shutter to extend therebetween when the first shutter and the second shutter are positioned at closed positions. The first movable member and the second movable member may apply forces in opposite directions away from each other so that as the first and second shutters move from closed positions to open positions.

16 Claims, 9 Drawing Sheets

ARTICLE DROPPING APPARATUS

This application claims priority to Japanese patent application serial number 2013-175189, the contents of which are incorporated herein by reference.

BACKGROUND OF THE INVENTION

1. Field of the Invention

Embodiments of the present invention relate to an article dropping apparatus used for dropping articles, for example, into containers.

2. Description of the Related Art

Japanese Patent No. 3088772 discloses an article dropping apparatus used for dropping articles that are U-shaped bags formed of plastic films and stacked in a layered manner. The article dropping apparatus includes a shutter device having a pair of shutters with end portions opposed to each other. In the state where the shutters are closed such that their end portions are positioned close to each other, the stacked articles may be put on the shutter device so as to straddle the end portions. Thereafter, the shutters are opened such that their end portions move away from each other. When this occurs, that the stacked articles may be dropped into a container that have an upper opening located below the shutter device. In this way, the stacked articles can be dropped into the container for subsequent packaging while the stacked state of the stacked articles is maintained.

However, as the stacked articles are dropped from the shutter device, they may be deformed or flexed such that their central portions are concaved downward. For this reason, the technique of the above patent may not be applied to articles such as wrapping sheets used for gyoza (an Asian food). The commercial value of the wrapping sheets may be lowered when they are deformed in this way.

Therefore, there has been a need in the art for a technique of inhibiting articles from being flexed when the articles are dropped from a shutter device.

SUMMARY OF THE INVENTION

In one aspect according to the present teachings, an article dropping apparatus may include a first shutter and a second shutter. A first movable member is movable relative to the first shutter. A second movable member is movable relative to the second shutter. An article may be supported by the first shutter and the second shutter to extend therebetween when the first shutter and the second shutter are at closed positions. The first movable member and the second movable member may apply forces in opposite directions away from each other. As the first and second shutters move from closed positions to open positions, these forces can be applied to the article supported by the first shutter and the second shutter.

DETAILED DESCRIPTION OF THE INVENTION

Figure 1:
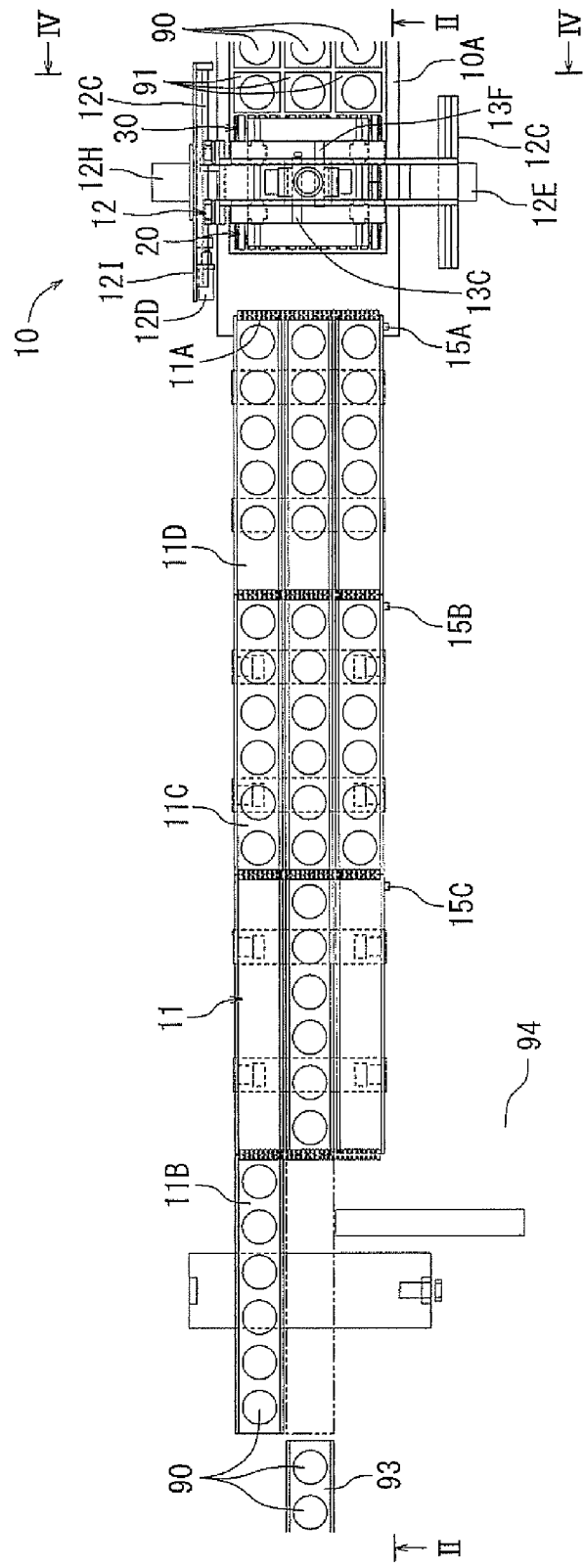
FIG. 1 is a plan view of an article dropping apparatus according to an embodiment.

Each of the additional features and teachings disclosed above and below may be utilized separately or in conjunction with other features and teachings to provide an improved article dropping apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one embodiment, an article dropping apparatus may include a first shutter movable between an open position and a closed position along a first direction, and a second shutter movable between an open position and a closed position along the first direction. The second shutter may move from the closed position to the open position as the first shutter moves from the closed position to the open position. The first shutter and the second shutter may be configured to allow a stack of articles to drop from between the first shutter and the second shutter as the first and second shutters move from the closed positions to the open positions. The first shutter may include a first conveyor having a first conveyer belt. The second shutter may include a second conveyor having a second conveyor belt. The first conveyor belt and the second conveyor belt may be configured to support the stack of articles such that the stack has a first portion supported by an upper portion of the first conveyor belt and a second portion supported by an upper portion of the second conveyor belt when the first and second shutters are positioned at the closed positions. The upper portion of the first conveyor belt and the upper portion of the second conveyor belt may be respectively driven to apply forces to the first portion and the second portion of the stack in opposite directions away from each other, as the first and second shutters move from the closed positions to the open positions.

In this way, as the first and second shutters move from the closed positions to the open positions, the upper portions of the first and second conveyor belts may respectively apply forces to the first portion and the second portion of the stack in opposite directions away from each other. In other words, frictional tensioning forces may be applied to the bottom surface of the lowermost article of the stack in opposite directions away from each other. Therefore, even in the case that the stacked articles are flexible ones, the stack may be prevented from being flexed and concaved downward at the central portion between the first portion and the second portion as it is dropped from between the first shutter and the second shutter. Therefore, the article dropping apparatus can be advantageously applied to articles whose commercial value would be lowered if they are flexed or deformed.

The first shutter may include a first leading end opposite the second shutter and a first base end opposite the first leading end. The second shutter may include a second leading end opposite to the first shutter and a second base end opposite to the second leading end. The first leading end of the first shutter and the second leading end of the second shutter may be positioned proximal to each other when the first and second shutters are positioned at the closed positions.

The first conveyor may further include a first leading end side pulley located on a side of the first leading end of the first shutter. The first conveyor may further include a first base end side pulley located on a side of the first base end of the first shutter. The second conveyor may further include a second leading end side pulley located on a side of the second leading end of the second shutter. The second conveyor may further include a second base end side pulley located on a side of the second leading end of the second shutter. The first conveyor belt may be engaged with the first leading end side pulley and the first base end side pulley so as to extend therebetween. The second conveyor belt may be engaged with the second leading end side pulley and the second base end side pulley so as to extend therebetween. The first leading end side pulley may have an outer diameter smaller than an outer diameter of the first base end side pulley. The second leading end side pulley may have an outer diameter smaller than an outer diameter of the second based end side pulley.

Because the first leading end side pulley and the second leading end side pulley may have smaller outer diameters, it may be possible to minimize a space that may be formed between the first conveyor belt and second conveyor belt on the lower side of the stack. In this way, it is possible to minimize potential downwardly concaving deformation of the central portion of the stack into the space due to the gravitational force.

The article dropping apparatus may further include a feeding conveyor configured to convey a plurality of stacks of articles and to feed the plurality of stacks of articles one after another to the first conveyor of the first shutter. Therefore, the first conveyor may receive the stacks one after another from the feeding conveyor and may convey the received stack to a position where the stack is supported between the upper portions of the first conveyor and the second conveyor for a subsequent dropping operation.

The article dropping apparatus may further include a support structure configured to support the first shutter and the second shutter, and a movement device configured to move the support structure between a first position for and a second position away from the first position. The feeding conveyor may include an upstream end and a downstream end along a conveying direction of the plurality of stacks of articles. The first based end portion of the first shutter may be positioned proximal to the feeding conveyor when the support structure is positioned at the first position.

The article dropping apparatus may further include a gas injection device located at the downstream end of the feeding conveyor. The gas injection device may be configured to inject gas toward the stack of articles from below for facilitating transfer of the stack of articles to the first conveyor belt of the first shutter when the support structure is positioned at the first position. With this arrangement, it is possible to prevent the stacks from sticking onto or caught by the feeding conveyor and the first conveyor belt of the first shutter during transfer from the feeding conveyor to the first conveyor belt. Therefore, it may be possible to prevent potential reduction of the commercial value of the stacked articles in this respect.

The article dropping apparatus may further include an article positioning device configured to position and align a stack of articles supported between the first shutter and the second shutter when the first shutter and the second shutter are positioned at the closed positions.

A representative embodiment will now be described with reference to the drawings.

Figure 2:
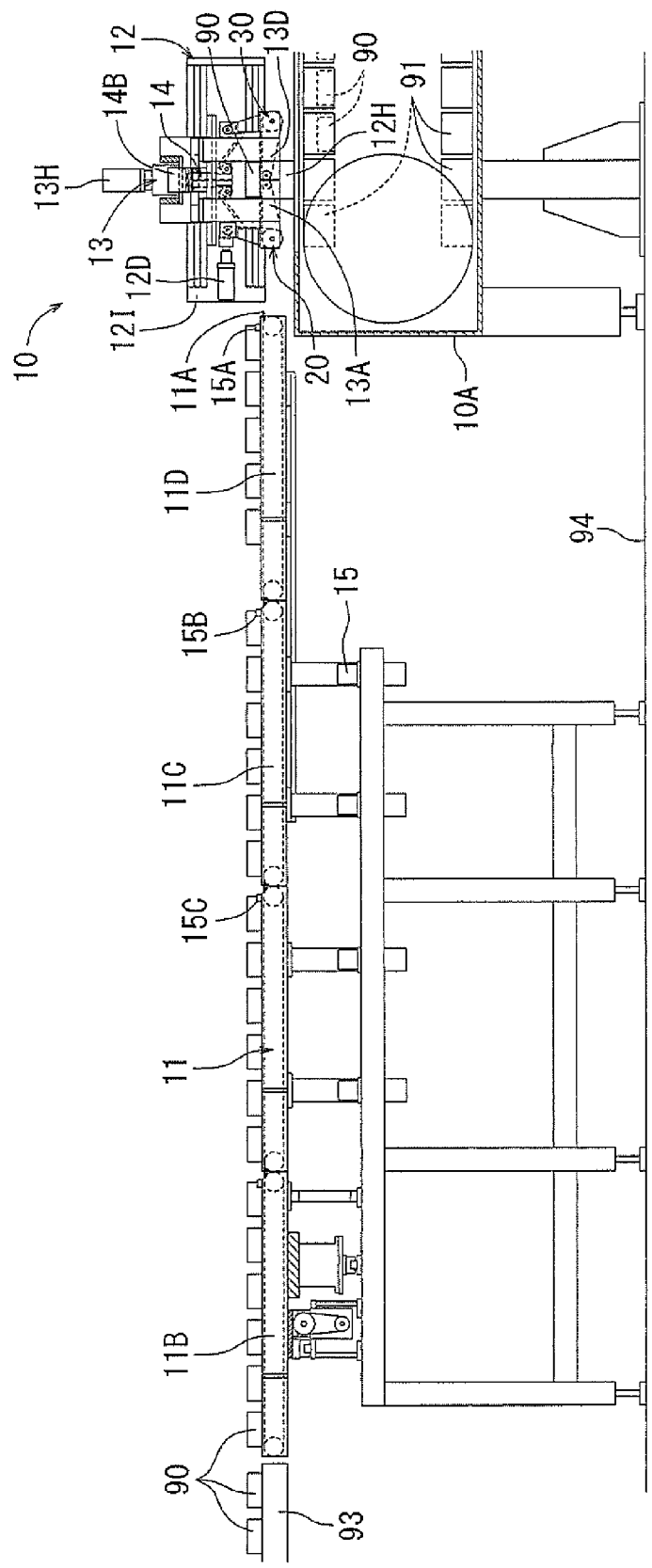
FIG. 2 is a sectional view taken along line II-II in FIG. 1.

Referring to FIGS. 1 and 2, a container transfer conveyor 10A may move a plurality of containers 91. An article dropping apparatus 10 may drop a plurality of stacks 90, each having a predetermined number of stacked articles 90A, into the containers 91. The stacked articles 90A may be wrapping sheets for gyoza, and each of the article stacks 90 may include, for example, fifty stacked articles 90A in the case of the gyoza wrapping sheets, vertically stacked in a layered manner.

The containers 91 may be formed using a container forming machine (not shown) located external to the article dropping apparatus 10. The containers 91 may be formed from a bottom film that may be a transparent thermoplastic film such as a polypropylene film. For example, the container forming machine may store the bottom film in a rolled form. The rolled bottom film may be unrolled and formed into the containers 91 through a continuous vacuum molding process, so that the containers 91 arranged in three rows and having downwardly oriented openings (downwardly as viewed in FIG. 2) may be intermittently formed. The containers 91 formed by the container forming machine may be then transferred to a container transfer conveyor 10A. Here, the containers 91 formed through the continuous vacuum molding process are connected to each other. It is not required that the container forming machine separate the containers 91 from each other. Therefore, three rows of the containers 91 connected in series with each other are fed to the container transfer conveyor 10A (see FIG. 4).

The container transfer conveyor 10A may convey the containers 91 formed by the container forming machine to a heat seal machine (not shown) located externally of the article dropping apparatus 10. The heat seal machine may heat-seal a top film that may be a transparent thermoplastic film such as a polypropylene on the containers 91. In this way, deeply drawn packages may be formed by the top film and the containers 91. This will be described later.

During transfer of the containers 91 to the heat seal machine, the container transfer conveyor 10A may turn the containers 91 upside down, so that the openings of the containers 91 are oriented upward. This may allow the article stacks 90 to drop into the containers 91 (see FIG. 5) before the containers 91 are transferred to the heat seal machine. In this way, the heat seal machine may form deeply drawn packages each containing the article stack 90 by the top film and the containers 91.

Figure 5:
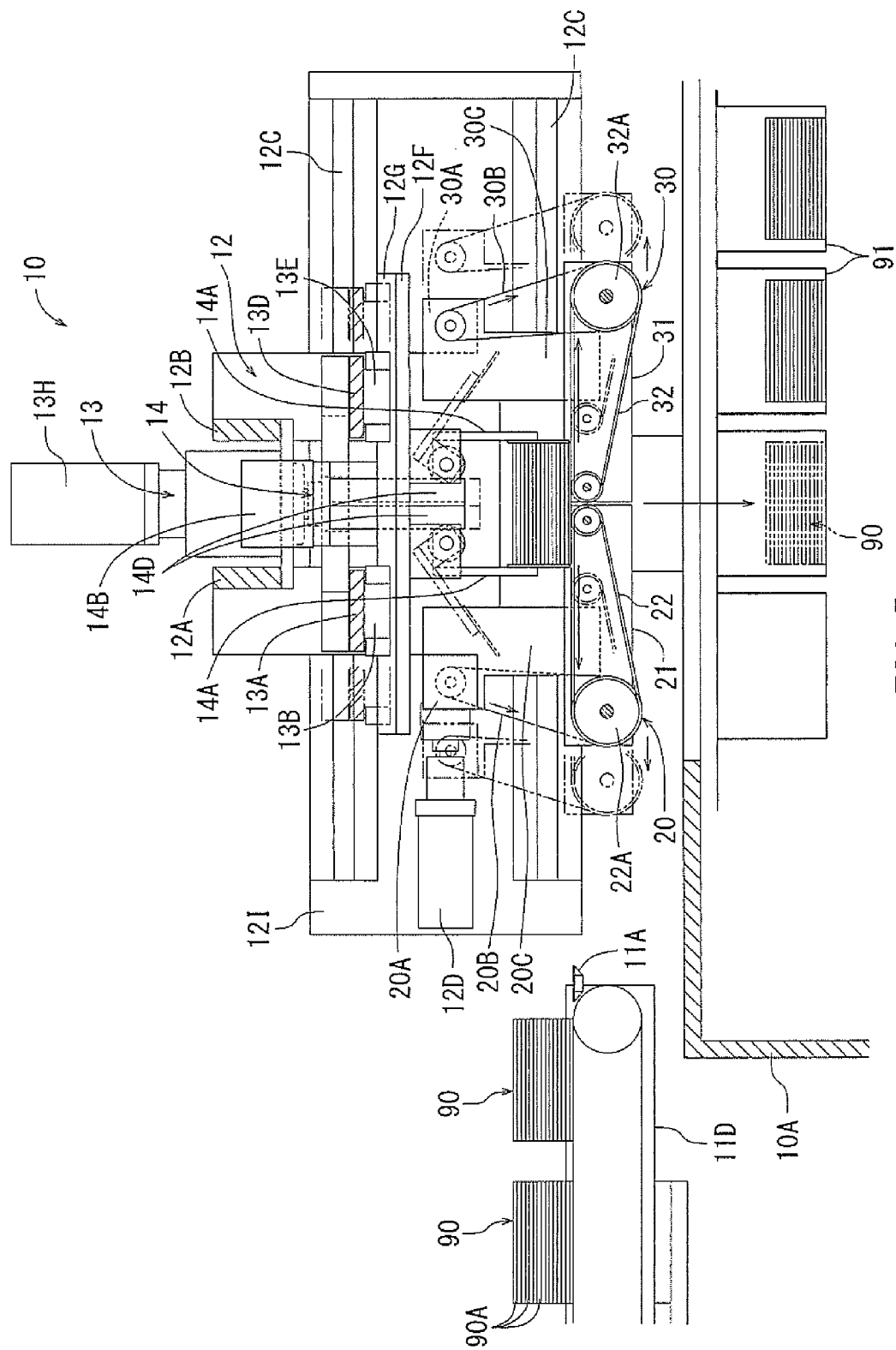
FIG. 5 is a sectional view taken along line V-V in FIG. 4 showing the operation for dropping stacks of articles into containers.

A control unit 15 shown in FIG. 2 may perform a drive control with respect to the container transfer conveyer 10A, so that the container transfer conveyor 10A may be intermittently driven in sync with the movement of the first shutter 20 and the second shutter 30 of the article dropping apparatus 10 (see FIG. 5). In this way, the container transfer conveyor 10A enables the article stacks 90 to be dropped into the containers 91 that are fed from the container forming machine.

When the stacked articles 90A are wrapping sheets for gyoza, the wrapping sheets may be formed by a wrapping sheet forming machine 93 (see FIG. 1). This wrapping sheet forming machine 93 may knead dough made from a mixture of flour, water and suitable additives such as salt, and may form the dough into sheets. More specifically, the wrapping sheet forming machine 93 may automatically perform operations for rolling the kneaded dough into a dough sheet, sprinkling flour such as cornstarch on the dough sheet, folding back the dough sheet by a given number of times, and punching the folded dough sheet by using punching dies to obtain stacks 90 of stacked articles 90A (gyoza wrapping sheets).

In this way, the wrapping sheet forming machine 93 may manufacture the stacks 90 without the need of manually stacking the articles 90A one by one. In this embodiment, six punching dies may simultaneously punch the folded dough sheet to form six stacks 90 at one time.

As shown in FIGS. 1 and 2, the wrapping sheet forming machine 93 may feed the stacks 90 to a transfer conveyor machine 11 in a state where the stacks 90 are arranged in three rows. The transfer conveyor machine 11 may include an automatic distributing device 11B, a standby conveyor 11C including three parallel conveyor sections, and a feeding conveyor 11D including three parallel conveyor sections. The automatic distributing device 11B, the standby conveyor 11C and the feeding conveyor 11D may be arranged in this order from an upstream side, i.e., the side where the stacks 90 are fed from the wrapping sheet forming machine 93 (left side as viewed in FIGS. 1 and 2) toward a downstream side (right side as viewed in FIGS. 1 and 2). More specifically, the automatic distributing device 11B, the standby conveyor 11C and the feeding conveyor 11D may be arranged along a straight line in a horizontal direction (left and right directions in FIG. 2).

The automatic distributing device 11B may distribute the stacks 90 fed from the wrapping sheet forming machine 93 to the three parallel conveyer sections of the standby conveyor 11C. The standby conveyor 11C may in turn transfer the distributed stacks 90 to a downstream side position (right side position as viewed in FIGS. 1 and 2), where the stacks 90 stand by for the subsequent operation. The standby conveyor 11C may supply the stacks 90 to the feeding conveyor 11D if no stacks 90 exist on the feeding conveyor 11D. In this way, the transfer conveyor machine 11 may transfer the stacks 90 horizontally from the upstream side toward the downstream side, so that the stacks 90 arranged in three rows may always exist on the feeding conveyor 11D.

The control unit 15 shown in FIG. 2 may control the operation of the transfer conveyor machine 11. To this end, the control unit 15 may include a sensor 15A that may be attached to the feeding conveyor 11D for detecting the presence of the stacks 90 on the feeding conveyor 11D. Based on the result of detection by the sensor 15A, the control unit 15 may control the supply of the stacks 90 from the standby conveyor 11C to the feeding conveyor 11D.

The control unit 15 may further include sensors 15B and 15C attached to the standby conveyor 11C for recognizing the distribution of the stacks 90 on the standby conveyor 11C. Based on the result of recognition of the distribution of the stacks 90 by the sensors 15B and 15C, the control unit 15 may control the standby conveyor 11C to move the standby conveyor 11C for transferring the stacks 90 toward the downstream side (right side as viewed in FIGS. 1 and 2) or to stop the standby conveyor 11C in a standby mode.

In addition, the control unit 15 may continuously determine whether or not there exists a free area on the standby conveyor 11C. If a free area exists, additional stacks 90 can be fed onto the standby conveyor 11C.

As long as the control unit 15 determines that there is no such a free area, the control unit 15 sends instructions to the wrapping sheet forming machine 93 to temporarily stop the forming and feeding of any stacks 90. In this way, it is possible to prohibit excessive loading of the transfer conveyor machine 11.

The stacks 90 fed onto the feeding conveyor 11D may be further transferred onto the first shutter 20 from the downstream end of the feeding conveyor 11D (i.e., the downstream end of the transfer conveyor machine 11). As shown in FIG. 1, the first shutter 20 may be arranged along a horizontal line extending from the side of the feeding conveyor 11D (left side) toward the opposite side (right side as viewed in FIG. 7) of the feeding conveyor 11D. The automatic distributing device 11B and the conveyers 11C and 11D are arranged along this horizontal line.

In this embodiment, the first shutter 20 is arranged in the right and left directions. The side of the feeding conveyor 11D (left side) with respect to the first shutter 20 will be referred to as a "first side", and the opposite side will be referred to as a "second side."

Figure 6:
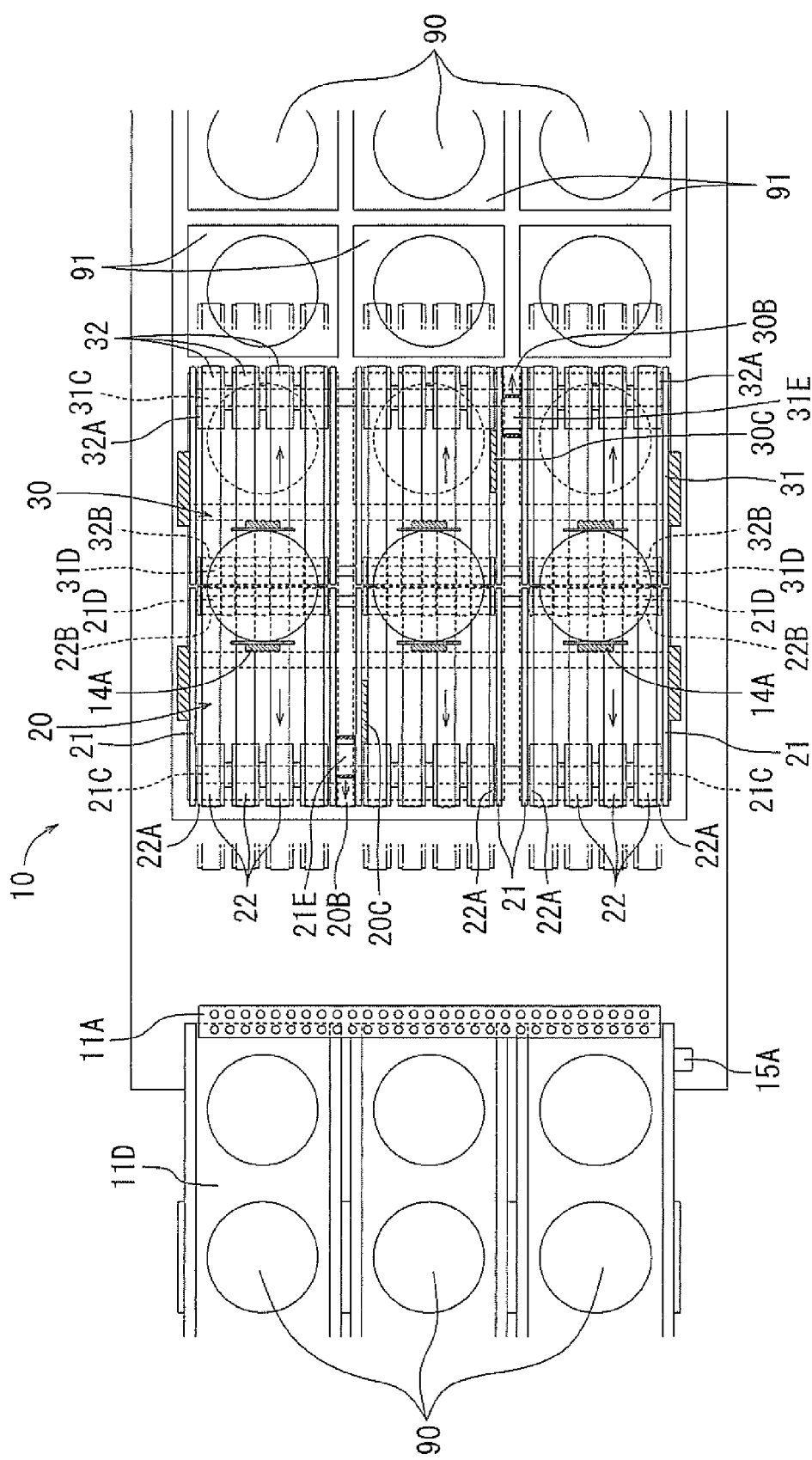
FIG. 6 is a sectional view taken along line VI-VI in FIG. 4 showing the operation for dropping stacks of articles into containers.
Figure 9:
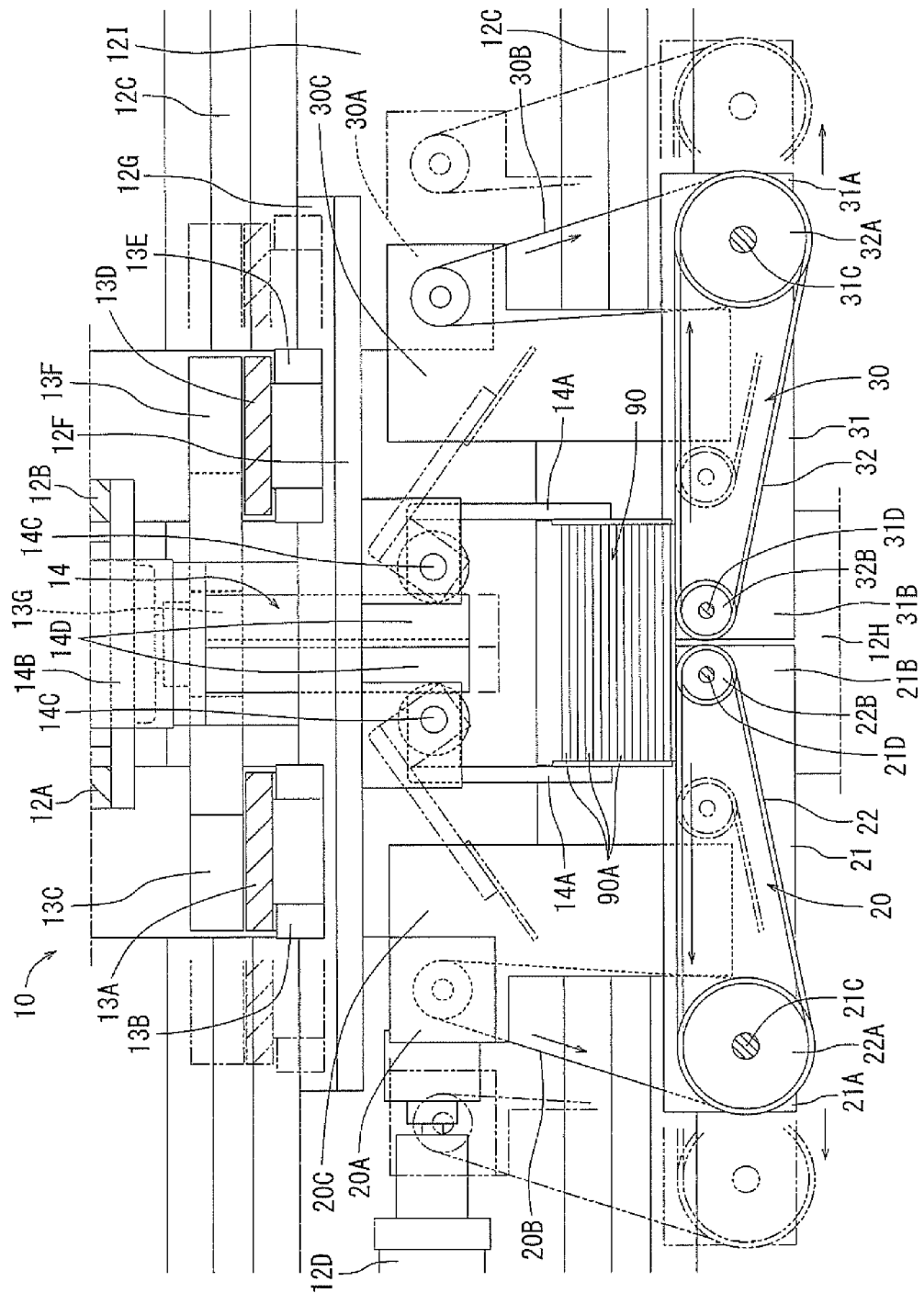
FIG. 9 is an enlarged view of a part of FIG. 5.

As shown in FIG. 6, the first shutter 20 may include three parallel shutter sections that respectively correspond to the three parallel conveyor sections of the feeding conveyor 11D. Each of the shutter sections may be supported between a pair of side plates 21 from opposite lateral sides (upper and lower sides as viewed in FIG. 6). As shown in FIG. 9, each of the side plates 21 may include a first base end portion 21A and a first leading end portion 21B positioned on the first side (left side) and the second side (right side), respectively.

As shown in FIGS. 6 and 9, the side plates 21 may be joined together at the first leading end portions 21B via a connecting shaft 21D having a round rod-like shape. As shown in FIG. 6, three sets of four first leading end side pulleys 22B, each configured as a toothed pulley, are rotatably mounted to the connecting shaft 21D at positions respectively corresponding to the three shutter sections of the first shutter 20.

Figure 8:
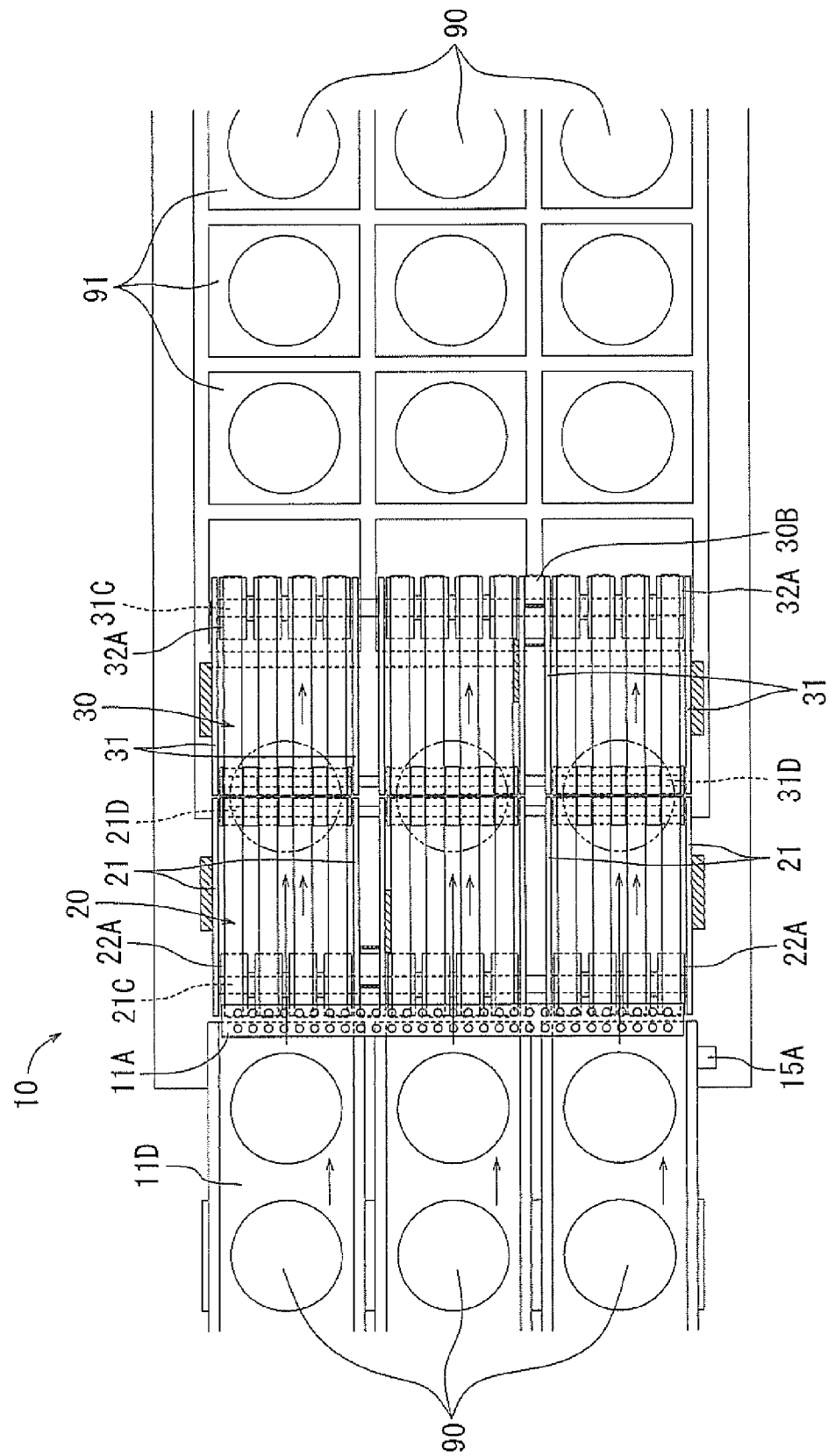
FIG. 8 is a view similar to FIG. 6 but showing the operation for feeding the stacks of articles from the feeding conveyor to the first conveyor belt.

As shown in FIGS. 6 and 9, a rotational shaft 21C having a round rod-like shape may be inserted into the first base end portion 21A (see FIG. 9) of the side plates 21 to extend therethough, so that the rotational shaft 21C can rotate relative to the side plates 21 about a rotational axis. As shown in FIGS. 6 and 8, three sets of four first base end side pulleys 22A each configured as a toothed pulley are fixedly mounted to the rotational shaft 21C at positions respectively corresponding to the three shutter sections of the first shutter 20.

As shown in FIGS. 6 and 9, three sets of four first conveyor belts 22 (see FIG. 6) configured as a toothed belt may respectively engage the three sets of the first leading end side pulleys 22B and the three sets of the first base end side pulleys 22A to extend therebetween. In this way, as shown in FIG. 9, the upper surface of the first shutter 20 which receives and supports the stacks 90 may be formed by upper portions of the first conveyor belts 22. These first conveyor belts 22 extend horizontally from the side of the first leading end portions 21B toward the side of the first based end portions 21A.

In this way the connecting shaft 21D, the first leading end side pulleys 22B, the rotational shaft 21C, the first base end side pulleys 22A and the first conveyor belts 22 can collectively act as a belt conveyor supported by the side plates 21.

Figure 3:
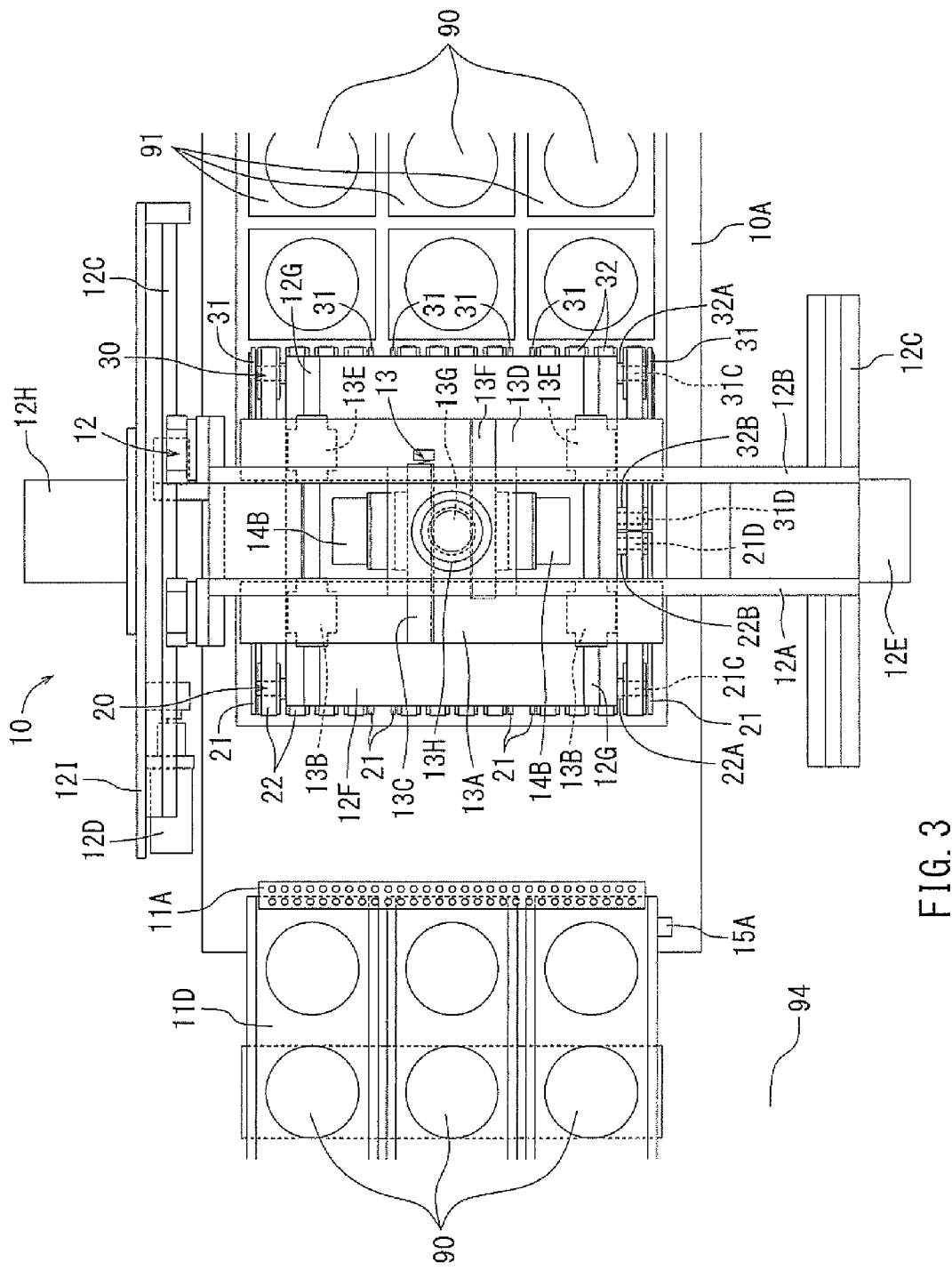
FIG. 3 is an enlarged view of a part of FIG. 1.

As shown in FIG. 3, two (the uppermost one and the lowermost one shown in FIG. 6 in this embodiment) of the six side plates 21 supporting the three shutter sections may be fixedly mounted to a suspending frame 13A of a shutter opening and closing device 13. The suspending frame 13A may include a pair of sliders 13B. The pair of sliders 13B may protrude downward from the suspending frame 13A and may be slid along a pair of support rails 12G of a reciprocating slide device 12. The pair of support rails 12G may extend parallel to the arrangement direction of the first shutter 20. By applying force to the pair of sliders 13B, they may slide along the pair of support rails 12G in the shutter arrangement direction. The first shutter 20 may thereby move to reciprocate relative to the reciprocating slide device 12.

In this way, the suspending frame 13A may serve as a support structure for supporting the side plates 21 and the belt conveyor of the first shutter 20.

Figure 4:
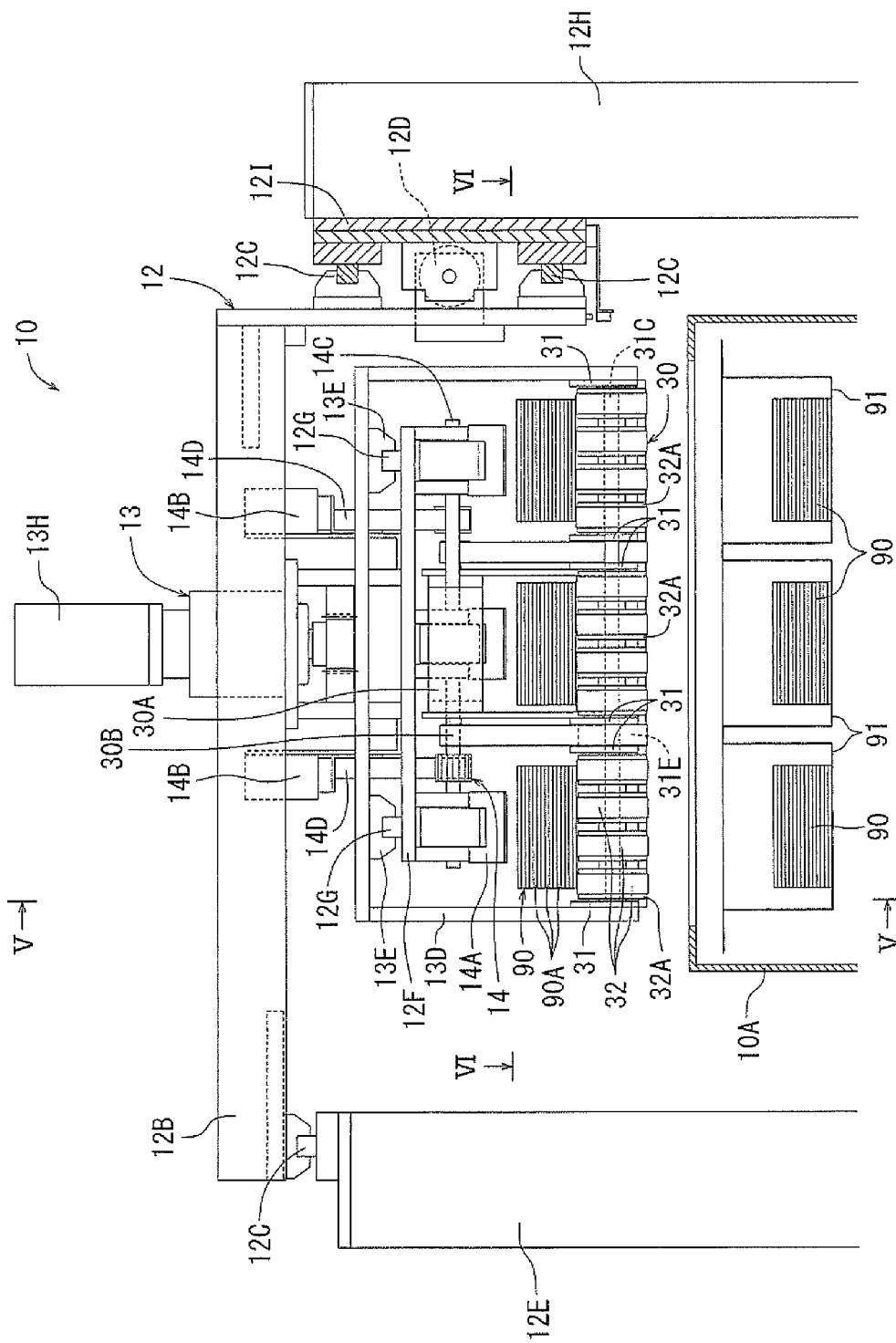
FIG. 4 is a sectional view taken along line IV-IV in FIG. 1.

As shown in FIGS. 3 and 4, the pair of support rails 12G may be mounted to the upper surface of a suspended plate 12F suspended from a pair of suspension beams 12A and 12B of the reciprocating slide device 12. The pair of suspension beams 12A and 12B may extend horizontally in a direction perpendicular to the shutter arrangement direction.

In this way, the pair of support rails 12G, the suspended plate 12F and the pair of suspension beams 12A and 12B may serve as a support structure for slidably supporting the suspending frame 13A together with the side plates 21 and the belt conveyor of the first shutter 20. As will be explained later, this support structure, together with side plates 31 and a belt conveyor of the second shutter 30, may also serve to slidably movably support a suspending frame 13B.

The pair of suspension beams 12A and 12B may be slidably supported by a pair of support posts 12E and 12H via three rails 12C extending parallel to the shutter arrangement direction. The pair of support posts 12E and 12H may be fixedly mounted to a floor 94 so as to extend vertically upward therefrom and may be positioned on opposite sides (left and right sides as viewed in FIG. 4) with respect to the container transfer conveyor 10A. As viewed in FIG. 4, one of the three rails 12C may be mounted to the upper end surface of the support post 12E positioned on the left side. The other two of the three rails 12C may be mounted to a lateral surface (left surface as viewed in FIG. 4) of the support post 12H and may be spaced from each other in the vertical direction. The previously mentioned support post 12H is located on the right side of FIG. 4. In this way, the pair of suspension beams 12A and 12B can move together with the suspended plate 12F and the pair of support rails 12G in the shutter arrangement direction relative to the support posts 12E and 12H. Also, the shutter 20 can move relative to the pair of support rails 12G in the same direction.

As shown in FIGS. 1 and 3, a support beam 121 may be mounted to the lateral surface (left surface) of the support post 12H and may extend in the shutter arrangement direction. The aforementioned two of the three rails 12C may be mounted to the support beam 121. In addition, a movement device 12D may be mounted to the support beam 121 for moving the suspension beams 12A and 12B in the shutter arrangement direction under the control of the control mechanism 15 (see FIG. 2).

In this way, the support posts 12E and 12H may serve as a support structure for slidably supporting the suspension beams 12A and 12B. These suspension beams 12A and 12B serve as the support structure for slidably movably supporting the first shutter 20 and the second shutter 30.

Figure 7:
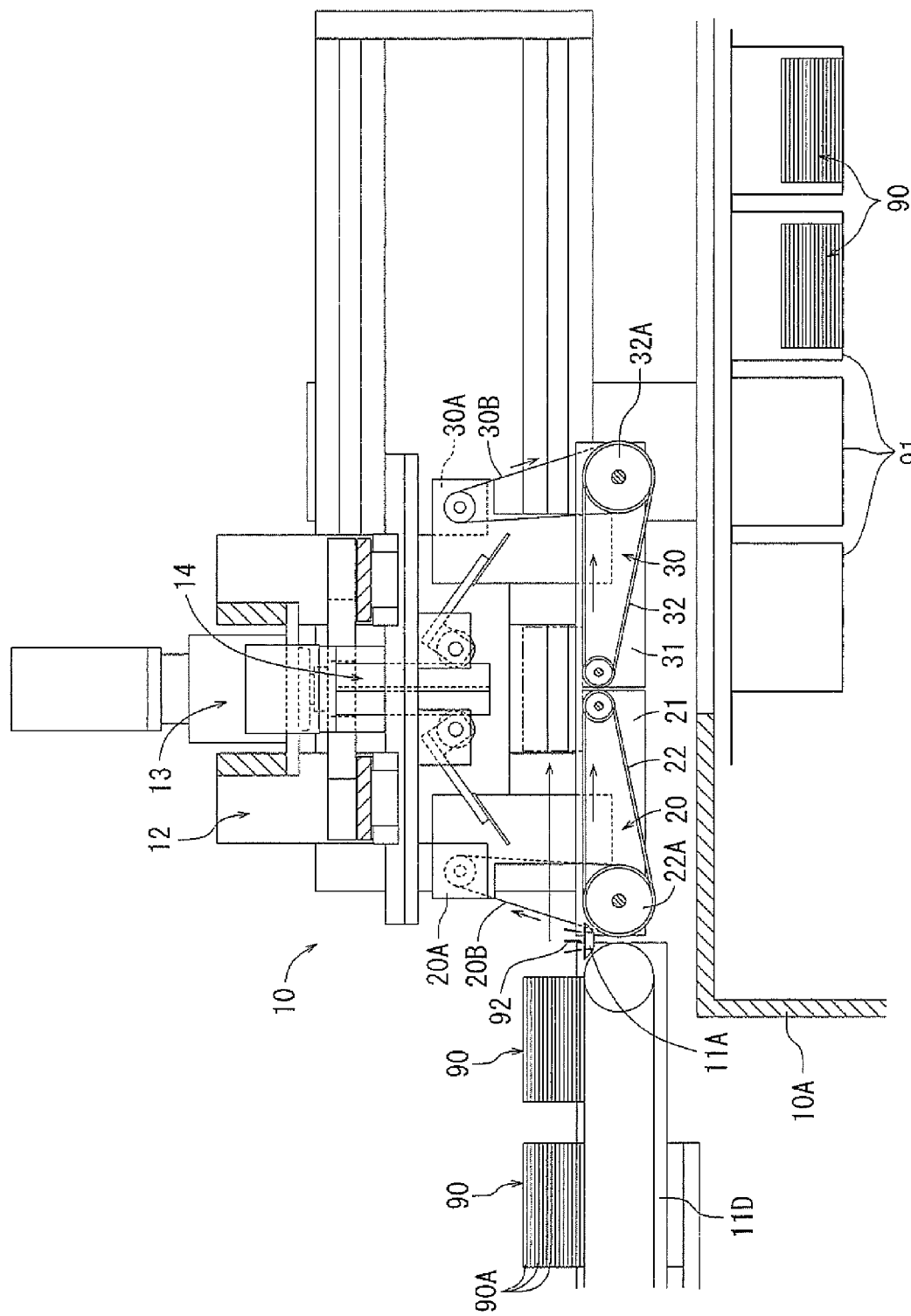
FIG. 7 is a view similar to FIG. 5 but showing the operation for feeding stacks of articles from a feeding conveyor to a first conveyor belt of a first shutter.

As shown in FIGS. 5 and 8, the reciprocating slide mechanism 12 may move the suspension beams 12A and 12B along the guide rails 12C by the operation of the movement device 12D. As the suspension beams 12A and 12B move in this way, the first shutter 20 can move together with or relative to the suspension beams 12A and 12B along the pair of support rails 12G. This is accomplished by the operation of the shutter opening and closing device 13 as will be explained later. In this way, the first shutter 20 can move together with the suspension beams 12A and 12B. Also, as shown in FIGS. 7 and 8, the first base end side pulleys 22A may move between an article receiving position and a position away from the article receiving position in the horizontal direction. The article receiving position is located proximal to the downstream end of the transfer conveyor machine 11 (more specifically, the downstream end of the feeding conveyor 11D).

When the first base end side pulleys 22A are positioned at the article receiving position, the stacks 90 may be transferred from the downstream end of the feeding conveyor 11D onto the first conveyor belts 22 that engages the first based end side pulleys 22A. More specifically, in this embodiment, the stacks 90 may be transferred one by one such that three stacks 90 are transferred onto the respective three sets of four first conveyor belts 22.

As shown in FIGS. 1 to 3 and 5 to 8, an aseptic gas injection pipe 11A having a flat upper surface with a plurality of gas injection holes may be arranged at the downstream end of the feeding conveyor 11D so as to extend in a direction perpendicular to the shutter arrangement direction (upward and downward directions as viewed in FIG. 1). The aseptic gas injection pipe 11A may be connected to a pressurized gas supply source (not shown) via a sterilization filter (not shown), so that pressurized gas, such as air supplied from the pressurized gas supply source, may be sterilized by the sterilization filter before being injected from the gas injection holes of the aseptic gas injection pipe 11A.

The control unit 15 (see FIG. 2) may control the operation such that the pressurized gas is supplied to the aseptic gas injection pipe 11A when the first base end side pulleys 22A are positioned at the article receiving position. Therefore, as shown in FIG. 7, the aseptic gas used for the injection gas 92, may be injected upward from the gas injection holes of the aseptic gas injection pipe 11A. In this way, the aseptic gas injection pipe 11A may serve as a gas injection device.

The injection gas 92 may be injected upward at the downstream end of the transfer conveyor machine 11 during the transfer of the stacks 90 from the transfer conveyor machine 11 to the first conveyor belts 22. Therefore, it may be possible to prevent the stacks 90 from sticking to or getting caught by the transfer conveyer machine 11 (more specifically, the feeding conveyor 11D) and the first conveyor belts 22 during the transfer.

In this way, it may be possible to prevent deformation of the stacks 90 which may be caused as a result of sticking or being caught. Hence it is possible to maintain the commercial value of the stacks 90.

As shown in FIG. 6, a toothed pulley 21E may be fixedly mount to the rotational shaft 21C of the first shutter 20 at a position between two adjacent shutter sections that are shown on the upper side. A drive motor 20A (see FIG. 9) may be mounted to a mount plate 20C that is fixedly mounted to one of two side plates 21 positioned on opposite sides of the toothed pulley 21E.

The rotation of the drive motor 20A may be transmitted to the toothed pulley 21E via a toothed belt 20B, so that the rotational shaft 21C rotates to drive the first conveyor belts 22 via the respective first base end side pulleys 22A. Therefore, the stacks 90 placed on the upper surfaces of the first conveyor belts 22, i.e., the upper surface of the first shutter 20, may move in the moving direction of the upper surfaces of the first conveyor belts 22.

The control unit 15 (see FIG. 2) may control the rotational direction and the rotational speed of the drive motor 20A. Therefore, the upper surface of the first shutter 20 may move in a direction toward the first leading end portions 21B of the side plates 21 (rightward as viewed in FIG. 9) or in an opposite direction toward the first base end portions 21A (leftward as viewed in FIG. 9) at a controlled speed. In this way, the first shutter 20 can move the stacks 90 toward the first side (leftward as viewed in FIG. 7) or toward the second side (rightward as viewed in FIG. 5) at a controlled speed.

A second shutter 30 may be arranged on the second side of the first shutter 20. As shown in FIGS. 5 through 9, the second shutter 30 may oppose the first shutter 20 in the arrangement direction of the first shutter 20. More specifically, as shown in FIGS. 6 and 8, the second shutter 30 may be arranged so as to extend from the second side toward the first side (leftward as viewed in FIGS. 6 and 8).

As shown in FIGS. 4 and 8, the second shutter 30 may include three parallel shutter sections that respectively correspond to the three parallel shutter sections of the first shutter 20. Each of the shutter sections of the second shutter 30 may be supported between a pair of side plates 31 from opposite lateral sides (upper and lower sides as viewed in FIG. 4). As shown in FIG. 9, each of the side plates 31 may include a second base end portion 31A and a second leading end portion 31B positioned on the second side (right side) and the first side (left side), respectively.

Except for when they drop the stacks 90, the first shutter 20 and the second shutter 30 may be held at closed positions where the first leading end portions 21B of the side plates 21 and the second leading end portions 31B are positioned proximal to each other. This is shown in FIG. 9 and will be explained later.

As shown in FIGS. 8 and 9, the side plates 31 may be joined together at the first leading end portions 31B via a connecting shaft 31D having a round rod-like shape. As shown in FIG. 6, three sets of four second leading end side pulleys 32B are configured as a toothed pulley and rotatably mounted to the connecting shaft 31D at positions respectively corresponding to the three shutter sections of the second shutter 30.

As shown in FIGS. 4, 8 and 9, a rotational shaft 31C may be inserted into the second base end portion 31A (see FIG. 9) of the side plates 31 to extend therethough, so that the rotational shaft 31C can rotate relative to the side plates 31. As shown in FIGS. 6 and 8, three sets of four second base end side pulleys 32A configured as a toothed pulley may be fixedly mounted to the rotational shaft 31C at positions respectively corresponding to the three shutter sections of the second shutter 30.

As shown in FIGS. 6 and 9, three sets of four second conveyor belts 32 configured as a toothed belt may respectively engage the three sets of the second leading end side pulleys 32B and the three sets of the second base end side pulleys 32A to extend therebetween. In this way, as viewed in FIG. 5, the upper surface of the second shutter 20 for receiving and supporting the stacks 90 may be formed by upper portions of the second conveyor belts 32 that extend horizontally from the side of the second leading end portions 31B toward the side of the second based end portions 31A.

As shown in FIG. 3, two (the uppermost one and the lowermost one shown in FIG. 6 in this embodiment) of the six side plates 31 supporting the three shutter sections may be fixedly mounted to a suspending frame 13D of the shutter opening and closing device 13. The suspending frame 13D may include a pair of sliders 13E. As shown in FIGS. 3 and 4, the pair of sliders 13E may protrude downward as viewed in FIG. 4 from the suspending frame 13D. They can be slid along the pair of support rails 12G or the reciprocating slide device 12. The pair of support rails 12G may extend parallel to the arrangement direction of the first shutter 20.

In this way, the second shutter 30 can move relative to the pair of support rails 12G in the shutter arrangement direction by way of the pair of sliders 13E. The pair of support rails 12G can move together with the suspension beams 12A and 12B relative to the support posts 12E and 12H that are fixed to the floor 94 as described previously.

As described previously, the reciprocating slide mechanism 12 may move the suspension beams 12A and 12B along the guide rails 12C by the operation of the movement device 12D. In this way, the first shutter 20 and the second shutter 30 can move together with the suspension beams 12A and 12B. Meanwhile, the first shutter 20 and the second shutter 30 can move relative to the suspension beams 12A and 12B along the pair of support rails 12G by the operation of the shutter opening and closing device. This will be explained later.

As shown in FIGS. 4, 6 and 8, a toothed pulley 31E may be fixedly mounted to the rotational shaft 31C of the second shutter 30 at a position between two adjacent shutter sections that are shown on the lower side of FIG. 6. A drive motor 30A (see FIG. 4) may be mounted to a mount plate 30C. The mount plate 30C may be fixedly mounted to one of two side plates 31 positioned on opposite sides of the toothed pulley 31E.

The rotation of the drive motor 30A may be transmitted to the toothed pulley 31E via a toothed belt 30B. In this way, the rotational shaft 31C rotates to drive the second conveyor belts 32 via the respective second base end side pulleys 32A. Therefore, the stacks 90 placed on the upper surfaces of the second conveyor belts 32, i.e., the upper surface of the second shutter 20, may move in the moving direction of the upper surfaces of the second conveyor belts 32.

The control unit 15 (see FIG. 2) may control the rotational speed of the drive motor 20A without changing the rotational direction of the drive motor 20A.

Therefore, the upper surface of the second shutter 30 may move in a direction toward the second base end portions 31A of the side plates 31 (rightward as viewed in FIG. 9) at a controlled speed. In this way, the second shutter 20 can move the stacks 90 toward the second side (rightward as viewed in FIG. 5) at a controlled speed.

An article clamping device 14 may be mounted to the suspension plate 12F suspended from the pair of suspension beams 12A and 12B. The article clamping device 14 may include three sets of first and second clamping members 14A (see FIG. 5) and a pair of rack moving devices 14B (see FIG. 4). As shown in FIGS. 4 and 9, the three sets of first and second clamping members 14A are respectively arranged so as to correspond to the three sets of shutter sections of the first and second shutters 20 and 30. The article clamping device 14 may further include a pair of support rods 14C each having a pinion and extending parallel to each other in directions perpendicular to the shutter arrangement direction (see FIG. 9). One of the support rods 14C may extend though the first clamping members 14A of the three sets so as to connect them to each other. The other of the support rods 14C may extend through the second clamping members 14A so as to connect them to each other. As shown in FIG. 9, the support rods 14C may be rotatably supported by brackets that are fixedly attached to the lower surface of the suspension plate 12F.

The rack moving devices 14B may be respectively connected to vertical racks 14D that engage the pinions of the support rods 14C. For example, the rack moving devices 14B may be hydraulic or pneumatic cylinders that can vertically move the vertical racks 14D upward and downward. One of the pinions of the support rods 14C may rotate in order to rotate the corresponding support rod 14C and to eventually cause movement of the first clamping members 14A. The other of the pinions of the support rods 14C may rotate in order to rotate the corresponding support rod 14C and to eventually cause movement of the second clamping members 14A.

The rack moving devices 14B may be controlled by the control unit 15 (see FIG. 2) such that the second clamping members 14A move in sync with the first clamping members 14A but in a direction opposite to the moving direction of the first clamping members 14A. More specifically, each of the first and second clamping members 14A moves from a standby position indicated by chain lines in FIG. 9 to a clamping position indicated by solid lines in FIG. 9. Here, each of the first and second clamping members 14A extends vertically downward. Preferably, each of the first and second clamping members 14A may reciprocate two times from the standby position to the clamping position.

During their reciprocating movements, the first and second clamping members 14A may be positioned above the first leading end side pulleys 22B and the second leading end side pulleys 22B. At this same time, the first shutter 20 and the second shutters 30 are at the closed positions. In this way, the first and second clamping members 14A may not interfere with the operation of the first shutter 20 and the second shutter 30.

The first and second clamping members 14A may operate to clamp and release the stacks 90 from opposite sides (left and right sides in the shutter arrangement direction) when the stacks 90 are positioned between the first conveyor belts 22 and the second conveyor belts 32.

In this connection, the first shutter 20 is positioned at the article receiving position proximal to the downstream end of the transfer conveyor machine 11 when the first shutter 20 and the second shutter 30 are positioned at the closed positions. At this time, the control unit 15 may move the upper surfaces of the first conveyor belts 22 and the second conveyor belts 23 toward the second side (right side as viewed in FIG. 9) at a controlled speed within a predetermined period of time, as the stacks 90 are transferred from the feeding conveyor 11D to the first conveyor belts 22. When the three stacks 90 transferred from the feeding conveyor 11D extend over and between the first conveyor belts 22 and the second conveyor belts 23, the movement of the first conveyor belts 22 and the second conveyor belts 23 may be stopped.

After that, the control unit 15 may control the movement device 12D of the reciprocating slide device 12 such that the first and second shutters 20 and 30 move from the article receiving position to the position shown in FIG. 5. Here, the stacks 90 may be dropped from the shutter device. This will further be explained later.

When the first and second shutters 20 and 30 have reached to the position shown in FIG. 5, the control unit 15 may operated the article clamping device 14 so that the first and second clamping members 14A move to reciprocate two times from the standby position to the clamping position. In this way, the first and second clamping members 14A may correctly position the stacks 90 so that they are evenly supported from opposite sides by the first conveyor belts 22 and the second conveyor belts 32. At the same time, the stacked articles 90A in each of the stacks 90 (see FIG. 5) may be correctly positioned so as to be aligned with each other in the vertical direction.

Further, the control unit 15 may operate the container conveyor 10A in sync with movement of the first and second clamp members 14A, such that three of the containers 91 for receiving the stacks 90 are located on the lower side of the stacks 90 that are to be dropped.

In this embodiment, as shown in FIGS. 6 and 9, the outer diameter of the first leading end side pulleys 22B is smaller than the outer diameter of the first base end side pulleys 22A. Similarly, the outer diameter of the second leading end side pulleys 32B is smaller than the outer diameter of the second base end side pulleys 32A.

Due to this arrangement, it may be possible to minimize a space formed between downwardly curved opposing portions of the first leading end side pulleys 22B and the second leading end side pulleys 32B on the lower side of the stacks 90. In this way, it may be possible to minimize the potentially downward concaving deformation of the stacks 90. This may be caused due to the dropping of the central portions of the stacks 90 into the space.

The opening and closing device 13 will now be described. As shown in FIG. 3, racks 13C and 13F may be respectively fixedly attached to the suspending frames 13A and 13D so as to extend parallel to each other in the shutter arrangement direction (left and right directions as viewed in FIG. 3. The racks 13C and 13F may be arranged such that the teeth of the rack(s) 13C and the rack 13F are opposed to each other. A pinion 13G may be positioned between the racks 13C and 13F so as to engage the teeth of both racks 13C and 13F.

The pinion 13G may be fixedly mounted to a drive shaft of a drive motor 13H. The drive motor 13H may be supported on a support bracket that is fixedly attached to the suspension beams 12A and 12B of the reciprocating slide device 12. The drive motor 13H serves as a drive source of the opening and closing device 13 and may be controlled by the control unit 15 with respect to the rotational direction and the rotational speed of the drive shaft.

With this arrangement, as the drive shaft of the drive motor 13H rotates, the racks 13C and 13F move in opposite directions at the same speed through engagement with the pinion 13G. As the rack 13C moves in this way, the suspending frame 13A and the side plates 21, to which the suspending frame 13A is mounted, moves together with the rack 13C. As the rack 13F moves, the suspending frame 13B and the side plates 31 (to which the suspending frame 13B is mounted) moves together with the rack 13F. In this way, the first shutter 20 and the second shutter 30 may move between the closing and opening positions. As shown in FIG. 9, as described previously, when the first shutter 20 and the second shutter 30 are at the closed positions, the first leading end portions 21B of the side plates 21 and the second leading end portions 31B are positioned proximal to each other in order to close the shutter.

The control unit 15 may control the first shutter 20 and the second shutter 30 such that they move from the closing position to the opening position after the clamping and releasing operations by the clamping members 14A have been finished. Preferably, this occurs before three of the containers 91 have their upper openings positioned on the lower side of the stacks 90 as shown in FIGS. 5 and 6.

As the first and second shutters 20 and 30 move from the opening positions to the closed positions, the stacks 90 may be dropped from the first and second shutters 30 and into the containers 91 (see FIG. 5).

When the first and second shutters 20 and 30 move from the opening positions to the closed positions, the control unit 15 may operate to start the drive motor 20A of the first conveyor belts 22 and the drive motor 30A of the second conveyor belts 32. When this occurs, that the upper portions of the first conveyor belts 22 move toward the first side and the upper portions of the second conveyor belts 32 move toward the second side. In other words, the upper portions of the first conveyor belts 22 and the upper portions of the second conveyor belts 32 move in opposite directions away from each other.

Therefore, the first conveyor belts 22 may force portions of the stacks 90 (more specifically, the lower surfaces of the lowermost stacked articles 90A of the stacks 90) which contact the first conveyor belts 22 towards the side of the first base end portions 21A (left side as viewed in FIG. 5). Simultaneously, the second conveyor belts 32 may force the portions of the stacks 90 (more specifically, the lower surfaces of the lowermost stacked articles 90A of the stacks 90) which contact the second conveyor belts 32 to move toward the side of the second base end portions 31A (right side as viewed in FIG. 5).

As the first shutter 20 and the second shutter 30 move to the opening positions for dropping the stacks 90, the first conveyor belts 22 and the second conveyor belts 32 apply frictional forces to the stacks 90 in order to pull the stacks 90 in opposite directions away from each other. In particular, these pulling forces may prevent the stacks 90 from becoming concaved at their central portions. In this way, the stacks 90 may be dropped into the containers 91 without being damaged. In this way, the dropping apparatus 10 can drop the stacks 90 without lowering the commercial value of the stacks 90.

After the stacks 90 have been dropped into the containers 91, the control unit 15 may operate the drive motor 13H of the opening and closing device 13 to move the first and second shutters 20 and 30 to the closed positions. Thereafter, the control unit 15 may operate the movement device 12D of the reciprocating slide device 12 such that the first and second shutters 20 and 30 move to the left from the position shown in FIG. 5 to the article receiving position for receiving the next stacks 90 from the feeding conveyor 11D.

These operations for receiving three of the stacks 90 from the feeding conveyor 11D and dropping them into the containers 91 by the article dropping apparatus 10 may be repeatedly performed.

The above embodiment may be modified in various ways as described as follows:

(1) In the above embodiment, wrapping sheets for gyoza are described as an example of the stacked articles. However, the above teachings of the article dropping apparatus 10 may be also applied to any other stacked articles, such as egg roll wrappers, wrappings sheets for wontons or spring rolls, and sliced meat or ham.

(2) While the article dropping apparatus 10 may be used for dropping the stacks 90 into the containers 91 of the deeply drawn packages, the present teachings may be also applied to other article dropping apparatuses, such as those used for tray packages. In addition, although the article dropping apparatus 10 is configured to drop three stacks at one time, the number of the stacks to be dropped may be varied.

(3) The aseptic gas injection pipe 11A typically injects air sterilized by the sterilization filter, however, the aseptic gas may be a different gas. For example, the aseptic gas may be air that is sterilized by heat. If the surrounding air has a high cleanliness, the surrounding air may be injected without being processed. The aseptic gas may be nitrogen gas or argon gas. Further, it may be possible to mix sprinkling flour into the aseptic gas.

(4) In some of the above embodiments when the first shutter 20 and the second shutter 30 move to the open positions for dropping the stacks 90, the first conveyer belts 22 and the second conveyor belts 32 have been used for apply forces to the stack 90 in opposite directions away from each other. The first conveyer belts 22 and the second conveyor belts 32, however, may be replaced with other devices. For example, rollers that are rotatably driven may be used. In such a case, flat plates having such rollers mounted to the leading end portions may form the first shutter 20 and the second shutter 30. The stacks 90 may be put between the first and second shutters via manual operation or through a suitable loading device.

What is claimed is:

1. An article dropping apparatus comprising:
   a first shutter horizontally movable between an open position and a closed position along a first direction, and
   a second shutter horizontally movable between an open position and a closed position along the first direction;
   wherein the second shutter moves from the closed position to the open position as the first shutter moves from the closed position to the open position;
   wherein the first shutter and the second shutter are configured to allow a stack of articles to drop from between the first shutter and the second shutter as the first and second shutters move from the closed positions to the open positions;
   wherein the first shutter comprises a first conveyor having a first conveyer belt;
   wherein the second shutter comprises a second conveyor having a second conveyor belt;
   wherein the first conveyor belt and the second conveyor belt are configured to support the stack of articles such that the stack has a first portion supported by an upper portion of the first conveyor belt and a second portion supported by an upper portion of the second conveyor belt when the first and second shutters are positioned at the closed positions; and
   wherein the upper portion of the first conveyor belt and the upper portion of the second conveyor belt are respectively driven to apply forces to the first portion and the second portion of the stack in opposite directions away from each other, as the first and second shutters move from the closed positions to the open positions.

2. The article dropping apparatus according to claim 1, wherein:
   the first shutter includes a first leading end opposed to the second shutter and a first base end opposite to the first leading end;
   the second shutter includes a second leading end opposed to the first shutter and a second base end opposite to the second leading end; and
   the first leading end of the first shutter and the second leading end of the second shutter are positioned proximal to each other when the first and second shutters are positioned at the closed positions.

3. The article dropping apparatus according to claim 2, wherein:
   the first conveyor further includes a first leading end side pulley located on a side of the first leading end of the first shutter and a first base end side pulley located on a side of the first base end of the first shutter;
   the second conveyor further includes a second leading end side pulley located on a side of the second leading end of the second shutter and a second base end side pulley respectively located on a side of the second base end of the second shutter; the first conveyor belt is engaged with the first leading end side pulley and the first base end side pulley so as to extend therebetween;
   the second conveyor belt is engaged with the second leading end side pulley and the second base end side pulley so as to extend therebetween;
   the first leading end side pulley has an outer diameter smaller than an outer diameter of the first base end side pulley; and
   the second leading end side pulley has an outer diameter smaller than an outer diameter of the second based end side pulley.

4. The article dropping apparatus according to claim 2, further comprising:

a feeding conveyor configured to convey a plurality of stacks of articles and to feed the plurality of stacks of articles one after another to the first conveyor of the first shutter.

5. The article dropping apparatus according to claim 4, further comprising:
a support structure configured to support the first shutter and the second shutter; and
a movement device configured to move the support structure between a first position and a second position;
wherein the feeding conveyor includes an upstream end and a downstream end along a conveying direction of the plurality of stacks of articles; and
wherein the first based end portion of the first shutter is positioned proximal to the downstream end of the feeding conveyor when the support structure is positioned at the first position.

6. The article dropping apparatus according to claim 5, further comprising a gas injection device located at the downstream end of the feeding conveyor, wherein:
the gas injection device is configured to inject gas toward each stack of articles from below for facilitating transfer of each stack of articles to the first conveyor belt of the first shutter when the support structure is positioned at the first position.

7. The article dropping apparatus according to claim 1, further comprising an article positioning device configured to position and align the stack of articles supported between the first shutter and the second shutter when the first shutter and the second shutter are positioned at the closed positions.

8. An article dropping apparatus comprising:
a first shutter horizontally movable between an open position and a closed position along a first direction;
a second shutter horizontally movable between an open position and a closed position along the first direction;
wherein the second shutter moves from the closed position to the open position as the first shutter moves from the closed position to the open position;
wherein the first shutter and the second shutter are configured to support an article such that the article has a first portion supported by the first shutter and a second portion supported by the second shutter when the first and second shutters are positioned at the closed positions;
wherein the first shutter and the second shutter are configured to allow the article to drop from between the first shutter and the second shutter as the first and second shutters move from the closed positions to the open positions;
a first movable member movable relative to the first shutter;
a second movable member movable relative to the second shutter;
wherein the first movable member and the second movable member are configured to respectively apply forces to the first portion and the second portion of the article in opposite directions away from each other, as the first and second shutters move from the closed positions to the open positions.

9. The article dropping apparatus according to claim 8, further comprising a first movement device configured to move the first shutter and the second shutter between the closed positions and the open positions in sync with each other.

10. The article dropping apparatus according to claim 9, further comprising a support structure configured to support the first movement device, the first shutter and the second shutter.

11. The article dropping apparatus according to claim 10, further comprising a second movement device configured to move the support structure together with the first and second shutters along the first direction.

12. The article dropping apparatus according to claim 10, further comprising an article positioning device configured to position the article relative to the first shutter and the second shutter such that the article is supported evenly by the first shutter and the second shutter when the first shutter and the second shutter are positioned at the closed positions.

13. The article dropping apparatus according to claim 8, wherein:
the first shutter comprises a first conveyor and the first movable member is a conveyor belt of the first conveyor; and
the second shutter comprises a second conveyor and the second movable member is a conveyor belt of the second conveyor.

14. The article dropping apparatus according to claim 13, further comprising a third conveyor configured to feed articles to the first conveyor or the second conveyor.

15. An article dropping apparatus comprising:
a first shutter supported by a first support and including a first movable member, the first support including a first drive device configured to move the first movable member with respect to the first support;
a second shutter supported by a second support and including a second movable member, the second support having a second drive device configured to move the second movable member with respect to the second support; and
a third support supporting the first support and the second support and having a third drive device configured to move the first support and the second support relative to each other, so that each of the first shutter and the second shutter is movable between a closed position and an open position;
wherein the first shutter and the second shutter are configured to support an article such that the article extends between the first shutter and the second shutter when the first shutter and the second shutter are positioned at the closed positions,
wherein the first shutter and the second shutter are configured to allow the supported article to drop from between the first shutter and the second shutter as the first shutter and the second shutter move from the closed positions to the open positions, and
wherein as the first shutter and the second shutter move from the closed positions to the open positions, the first movable member and the second movable member move to apply forces to the article from opposing sides in directions the same as that of the moving directions of the first shutter and the second shutter.

16. The article dropping apparatus according to claim 15, further comprising a fourth drive device configured to move the third support.

* * * * *